(12) United States Patent
Kopp

(10) Patent No.: US 9,435,242 B2
(45) Date of Patent: Sep. 6, 2016

(54) DEVICE AND METHOD FOR PURIFYING EXHAUST GASES FOR AN INTERNAL COMBUSTION ENGINE

(75) Inventor: Andre Kopp, Neckarsulm (DE)

(73) Assignee: AUDI AG, Ingolstadt (DE)

( * ) Notice: Subject to any disclaimer, the term of this patent is extended or adjusted under 35 U.S.C. 154(b) by 1724 days.

(21) Appl. No.: 12/674,457

(22) PCT Filed: Jul. 11, 2008

(86) PCT No.: PCT/EP2008/005672
§ 371 (c)(1),
(2), (4) Date: Apr. 14, 2011

(87) PCT Pub. No.: WO2009/024215
PCT Pub. Date: Feb. 26, 2009

(65) Prior Publication Data
US 2011/0185704 A1 Aug. 4, 2011

(30) Foreign Application Priority Data

Aug. 22, 2007 (DE) ......................... 10 2007 039 588

(51) Int. Cl.
| | |
|---|---|
| F01N 3/00 | (2006.01) |
| F01N 3/20 | (2006.01) |
| F01N 3/08 | (2006.01) |
| F01N 13/02 | (2010.01) |
| F01N 13/04 | (2010.01) |
| F01N 13/10 | (2010.01) |
| F02D 41/00 | (2006.01) |
| F02D 41/02 | (2006.01) |
| B01D 53/94 | (2006.01) |

(52) U.S. Cl.
CPC ......... *F01N 3/2073* (2013.01); *B01D 53/9481* (2013.01); *F01N 3/0814* (2013.01); *F01N 3/2053* (2013.01); *F01N 13/02* (2013.01); *F01N 13/04* (2013.01); *F01N 13/107* (2013.01); *F02D 41/0082* (2013.01); *F02D 41/0275* (2013.01); *B01D 53/9418* (2013.01);
(Continued)

(58) Field of Classification Search
USPC .................................................... 60/274–324
See application file for complete search history.

(56) References Cited

U.S. PATENT DOCUMENTS 5,778,667 A * 7/1998 Kinugasa .............. F01N 13/011
423/213.7
5,974,793 A * 11/1999 Kinugasa ........... B01D 53/9454
60/278

(Continued)

FOREIGN PATENT DOCUMENTS

EP 0878609 A 11/1998

*Primary Examiner* — Jesse Bogue
(74) *Attorney, Agent, or Firm* — Maier & Maier, PLLC

(57) ABSTRACT

The invention relates to a device and a method for purifying exhaust gases for an internal combustion engine, with a multi-flow exhaust gas system having, at least in individual regions, several partial exhaust gas lines, and in which a $NO_x$ storage catalytic converter device and a SCR catalytic converter device are located. According to the invention, the $NO_x$ storage catalytic converter device (7) and the SCR catalytic converter device (9) are arranged distributed on different partial exhaust gas lines (6, 8) such that for a nitrogen oxide-Filled nitrogen oxide store of the $NO_x$ storage catalytic converter device (7) for a specified time interval a defined amount of the exhaust gas flow (16) produced by substoichiometric rich operation of the internal combustion engine (2) for production of a reducing agent, in particular for producing ammonia, flows via the $NO_x$ storage catalytic converter device (7) to the SCR catalytic converter device (9), in which the produced reducing agent, in particular ammonia, can be stored.

4 Claims, 4 Drawing Sheets

(52) U.S. Cl.
CPC ...... *B01D 2251/2062* (2013.01); *B01D 2255/911* (2013.01); *F01N 2240/25* (2013.01); *F01N 2240/36* (2013.01); *F01N 2560/026* (2013.01); *Y02T 10/24* (2013.01)

(56) References Cited

U.S. PATENT DOCUMENTS

| | | | | |
|---|---|---|---|---|
| 6,047,542 A * | 4/2000 | Kinugasa | ........... | B01D 53/8696 123/443 |
| 6,173,568 B1 * | 1/2001 | Zurbig | ........... | B01D 53/9431 123/406.53 |
| 6,338,244 B1 * | 1/2002 | Guenther | ........... | B01D 53/9431 60/285 |
| 7,811,527 B2 * | 10/2010 | Robel | ........... | B01D 53/9431 422/180 |
| 8,256,214 B2 * | 9/2012 | Rioli | ........... | F02D 17/02 123/90.15 |
| 2007/0227143 A1 * | 10/2007 | Robel | ........... | F01N 3/2073 60/605.1 |
| 2007/0271908 A1 * | 11/2007 | Hemingway | ........... | F01N 3/0814 60/286 |
| 2009/0301067 A1 * | 12/2009 | Dingle | ........... | F01N 3/021 60/286 |

* cited by examiner

DEVICE AND METHOD FOR PURIFYING EXHAUST GASES FOR AN INTERNAL COMBUSTION ENGINE

The invention relates to a device for purifying exhaust gases for an internal combustion engine of a motor vehicle and a method for purifying exhaust gases for an internal combustion engine of motor vehicles.

Generic DE 103 00 298 A1 discloses a device for purification of exhaust gases for the exhaust gas line of an internal combustion engine which has a double-flow exhaust gas line, each segment of the line or partial exhaust gas line having one $NO_x$ storage catalytic converter, one $NO_2$ formation catalytic converter, one SCR catalytic converter, and a charging device for charging of a reducing agent. This structure is designed to ensure that the SCR catalytic converter with stored ammonia can reduce the nitrogen oxides which are still contained in the exhaust gas flow downstream from the $NO_x$ storage catalytic converter, at the same time the ammonia being oxidized. A separate sensor is assigned to each of the catalytic converters in each of the partial exhaust gas lines. This structure which is shown in FIG. 5 of DE 103 00 298 A1 is very complex and is thus expensive to produce both in terms of component engineering and also control engineering.

Furthermore, DE 698 04 371 T2 discloses an exhaust gas purification device for an internal combustion engine in which the engine is provided with a direct cylinder injection valve, in the exhaust gas line of the internal combustion engine there being an ammonia absorption denitrifier catalytic converter which can absorb ammonia from the exhaust gas. Furthermore, in the exhaust gas line there is also a $NO_x$ storage catalytic converter which can store $NO_x$ from the exhaust gas. Specifically, it is provided here that fuel is injected into the respectively affected cylinder by means of the fuel injection valve during the expansion or exhaust stroke of the internal combustion engine in order to make available a larger amount of $NO_x$ in the exhaust gas flow than is the case for exhaust gas with combustion of a rich air-fuel ratio. This exhaust gas, which has a high proportion of $NO_x$, is then supplied to a three-way catalytic converter or a $NO_x$ storage catalytic converter in which a large amount of ammonia is produced which is then supplied to the purification device in which the nitrogen oxides are reduced and the ammonia is oxidized. Specifically, here an ammonia absorption denitrifier catalytic converter as a SCR catalytic converter is connected downstream to a $NO_x$ storage catalytic converter such that in the case of a multi-flow design of the exhaust gas line (FIG. 12, FIGS. 23 to 27), the exhaust gas line in the region following the internal combustion engine has a double-flow design and, in each of these two partial exhaust gas lines, there is one $NO_x$ storage catalytic converter at a time. These two partial exhaust gas lines are then combined again into a single exhaust gas line in which the SCR catalytic converter device is located in the form of an ammonia absorption denitrifier catalytic converter. As a result of injection taking place during the exhaust stroke and the diversity of parts, the structure of the exhaust gas purification device as a whole is complex and expensive.

Conversely, the object of this invention is to make available a device and a method for purifying exhaust gases for an internal combustion engine which can carry out simple and reliable exhaust gas purification, in particular nitrogen oxide reduction, in a manner favorable for component technology.

SUMMARY OF THE INVENTION

According to the invention, it is provided that the $NO_x$ storage catalytic converter device and the SCR catalytic converter device are arranged distributed on different partial exhaust gas lines such that for the nitrogen oxide-filled nitrogen oxide store of the $NO_x$ storage catalytic converter device for a specified time interval a defined amount of the exhaust gas flow produced by substoichiometric rich operation of the internal combustion engine for production of a reducing agent, in particular for producing ammonia, flows via the $NO_x$ storage catalytic converter device to the SCR catalytic converter device in which the produced reducing agent, in particular ammonia, is stored.

Thus substoichiometric rich operation can be easily selected depending on the filled nitrogen oxide store of a $NO_x$ storage catalytic converter device for a specified time interval. In this way, the nitrogen oxides are released preferably with ammonia formation from the nitrogen oxide store and then a specified amount of exhaust gas, in particular, the entire amount of exhaust gas, is then routed from the NSC or $NO_x$ partial exhaust gas line to at least one SCR partial exhaust gas line in order to store the ammonia which has been formed with the nitrogen oxide nitrates which are being released in the nitrogen oxide store as the reducing agent in the respective SCR catalytic converter device of the existing SCR partial exhaust gas lines. This advantageously enables, in conjunction with multi-flow exhaust gas lines of internal combustion engines, the direct production of the reducing agent, in particular ammonia in the exhaust gas system so that the charging of a reducing agent or the additional injection of fuel into the exhaust gas flow can be advantageously avoided and effective nitrogen oxide reduction becomes possible in a manner which is simple in terms of structure and control engineering.

Especially preferably, it is provided here that a first cylinder group be assigned to a first partial exhaust gas line and a second cylinder group be assigned to a second partial exhaust gas line, in the first partial exhaust gas line forming the NSC partial exhaust gas line there being only one $NO_x$ storage catalytic converter device, while in the second partial exhaust gas line forming the SCR partial exhaust gas line there is only one SCR catalytic converter device. I.e., that preferably only one type of catalytic converter is assigned to each of the partial exhaust gas lines and they enable effective nitrogen oxide reduction with the simultaneous production of a reducing agent in the exhaust gas flow itself by optimized control of the exhaust gas flow by means of simple and reliable flow guide elements.

Thus the flow guide elements just addressed are triggered, for example, by means of the control device of the engine control device such that in the case of a nitrogen oxide store of the $NO_x$ storage catalytic converter device, which store has been filled by lean operation of the internal combustion engine, a flow connection provided upstream from the SCR catalytic converter device and downstream from the $NO_x$ storage catalytic converter device between the NSC and the SCR partial exhaust gas line is cleared such that with simultaneous substoichiometric rich operation of the first cylinder group assigned to the NSC partial exhaust gas line, a specified amount of the exhaust gas formed there, preferably all the exhaust gas formed there, flows with reduction or ammonia formation with the nitrogen oxide of the $NO_x$ storage catalytic converter device to the SCR catalytic converter device in which the produced reducing agent is stored. In conjunction with such a double-flow exhaust gas system, thus the reducing agent can be produced without additional injection of a reducing agent into the exhaust gas flow simply by a single switchover of the operating mode of one cylinder group.

Especially preferably, it is provided in this connection that the flow guide device during substoichiometric rich operation of the first group of cylinders blocks the NSC partial exhaust gas line downstream from the flow connection to the SCR partial exhaust gas line so that the entire amount of exhaust gas which has been formed in the first cylinder group overflows into the SCR partial exhaust gas line via the flow connection. Thus, especially effective and quantitatively high ammonia storage in the SCR catalytic converter device becomes possible.

As likewise just described, preferably, the second group of cylinders assigned to the SCR partial exhaust gas line during substoichiometric rich operation of the first cylinder group assigned to the NSC partial exhaust gas line is preferably furthermore operated in lean operation, as a result of which advantageous fuel reduction for operation of the internal combustion engine can be achieved and, depending on what the driver wants, the torque formation of the internal combustion engine can be influenced. The second cylinder bank can follow what the driver wants, for example, quite normally (gas pedal position).

The flow guide device is furthermore preferably designed such that during lean operation of the first cylinder group, i.e., during lean operation of the internal combustion engine, the flow connection between the NSC partial exhaust gas line and the SCR partial exhaust gas line is blocked so that the two partial exhaust gas flows of the double-flow exhaust gas system can flow out via their respective lines.

The double-flow configuration of the exhaust gas system here is the preferred configuration in which the SCR catalytic converter device is assigned to one and the $NO_x$ storage catalytic converter device is assigned to the other, second partial exhaust gas line. But fundamentally, here it can also be a multi-flow exhaust gas system in which there are optionally still further partial exhaust gas lines. In this case then, likewise, within the meaning of the invention, one NSC partial exhaust gas line at a time is always switched parallel with at least one SCR partial exhaust gas line and can be connected by way of a flow connection such that the production of the reducing agent according to the invention in the exhaust gas system itself can take place in conjunction with simply one switchover of the operating mode of the internal combustion engine, especially one cylinder group of the internal combustion engine, for effective nitrogen oxide reduction.

For reasons of better understanding, the invention is detailed below always in conjunction with the preferred double-flow exhaust gas line system, as has already taken place above, for better elucidation of the advantages according to the invention.

The flow connection between the two partial exhaust gas lines takes place preferably by an overflow pipe, in particular, a so-called intermediate cross connection, which discharges upstream from the SCR catalytic converter device into the SCR partial exhaust gas line and downstream from the $NO_x$ storage catalytic converter device into the NSC partial exhaust gas line.

The flow guide device is preferably formed by an exhaust gas flap arrangement or a valve arrangement.

This configuration of the flow connection and of the flow guide device can be easily managed in terms of component engineering and has high reliability of operation of the exhaust gas purification device.

According to a first specific configuration, the flow guide device can be formed by an exhaust gas flap arrangement with two exhaust gas flaps which can be triggered by means of the control device according to defined control parameters, of which the first exhaust gas flap clears or closes the overflow pipe, while the second exhaust gas flap is located downstream from the overflow pipe in the NSC partial exhaust gas line in order to clear or close it accordingly.

As an alternative, the flow guide device, however, can also be formed by a directional control valve, in particular, a 2-way valve located in the outlet region of the overflow pipe in the NSC partial exhaust gas line, and which, in the first switching position, blocks the flow connection to the overflow pipe with simultaneous release of the flow in the NSC partial exhaust gas line or which clears the flow connection to the overflow pipe in a second switching position with simultaneous blocking of the continuing flow in the SCR partial exhaust gas line.

According to another especially preferred configuration of the invention, the first cylinder group is formed by a first cylinder bank and the second cylinder group is formed by a second cylinder bank of an internal combustion engine, especially in a V-design, for example V6, V8, V10, V12 design. I.e., that here then ammonia can be produced without injection of a second fuel when using a double-flow exhaust gas line system in which only one of the cylinder banks experiences switchover of the operating mode. The teaching according to the invention is especially advantageous, in particular, in conjunction with these V engines.

The $NO_x$ storage catalytic converter device, like the SCR catalytic converter device, is preferably formed by a single $NO_x$ storage catalytic converter or SCR catalytic converter. Depending on the configuration of the internal combustion engine it can, however, also be necessary to successively switch optionally several such $NO_x$ storage catalytic converters or SCR catalytic converters in the respectively assigned exhaust gas lines, optionally in combination with a particle filter; this can be necessary, especially for diesel engines. But fundamentally, with the division of different catalytic converter types among different partial exhaust gas lines of the exhaust gas system of an internal combustion engine, the advantage is that here, by the corresponding control of the exhaust gas flows with simultaneous production of the reducing agent, effective nitrogen oxide reduction can be achieved with a smaller number of catalytic converters, i.e., in the individual exhaust gas lines, there need not be two different catalytic converter types (relative to $NO_x$ and SCR catalytic converters), as is the case in the embodiment of FIG. 5 of DE 103 00 298 A1. Likewise in this way, as is the case in DE 698 04 371 T2, a SCR catalytic converter with very large dimensions in a re-combined single exhaust gas line can be avoided. I.e., that with the teaching according to the invention, there can be an arrangement which is especially favorable with respect to component engineering with few catalytic converters; this greatly reduces production costs and fault susceptibilities or the need for repairs.

The switchover criterion between the individual operating ranges is preferably determined by a sensor means, here fundamentally one sensor means can be connected downstream to each catalytic converter device in each partial exhaust gas line in order to determine the corresponding breakthroughs of a specified pollutant, for example $NO_x$, and then to initiate switchover operation accordingly. Generally, it is, however, sufficient to provide, for example, only in the NSC partial exhaust gas line a sensor means following the $NO_x$ storage catalytic converter device since a nitrogen oxide breakthrough there indicates a filled $NO_x$ store so that then the switchover criterion for producing the reducing agent with simultaneous nitrogen oxide release from the nitrogen oxide storage catalytic converter is selected. By way of the same sensor means then, also the end of this brief substoichiometric rich operating mode for producing the reducing agent can be determined, in which likewise, in turn, it can be sensed by way of the nitrogen oxide concentration in the exhaust gas flow that there are no longer any nitrogen oxides for ammonia formation, for example, by way of the cross sensitivity of the $NO_x$ probes to $NH_3$ or also by way of the lambda signal of the first pump cell in the sensor. This is also analogous on the side of the SCR partial exhaust gas line by the sensor means which is connected downstream to the SCR catalytic converter device, here with respect to the ammonia as the sensed exhaust gas parameter.

DETAILED DESCRIPTION OF THE PREFERRED EMBODIMENTS OF THE INVENTION

Figure 1:
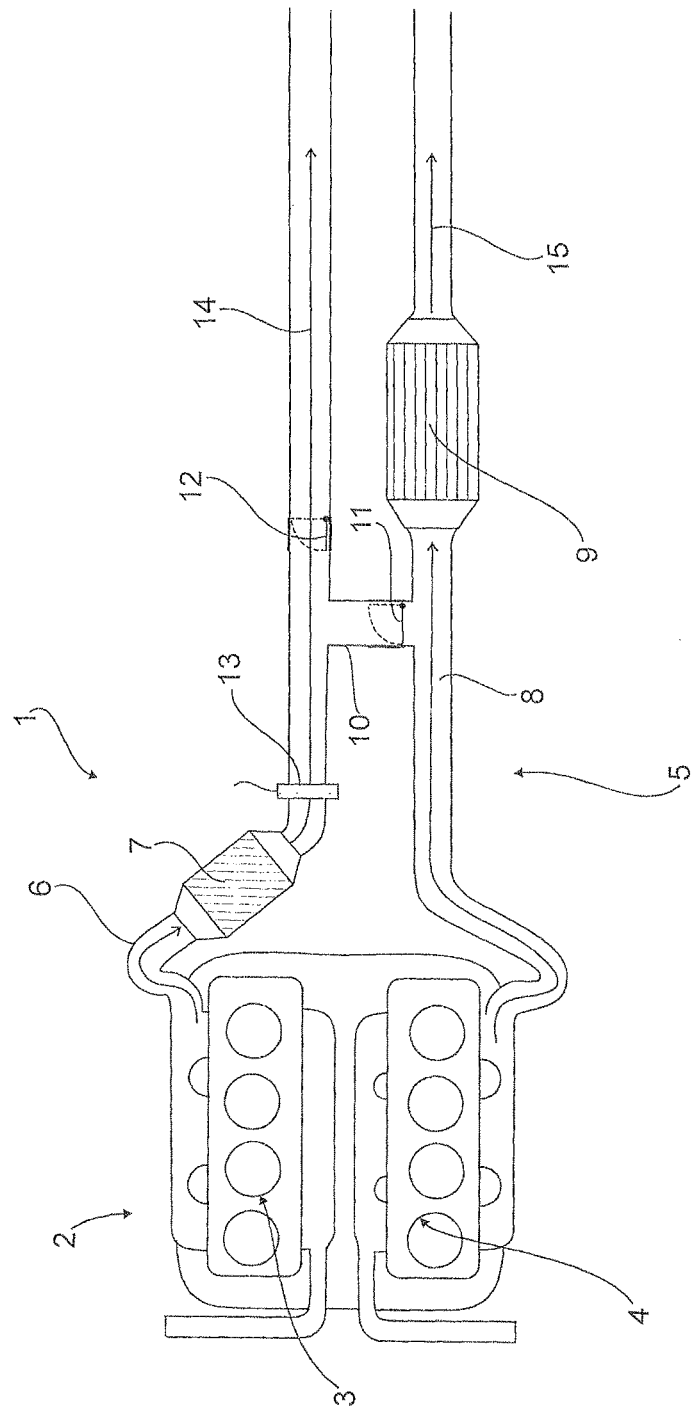
FIG. 1 shows a first embodiment of this invention in lean operation of the internal combustion engine.
Figure 2:
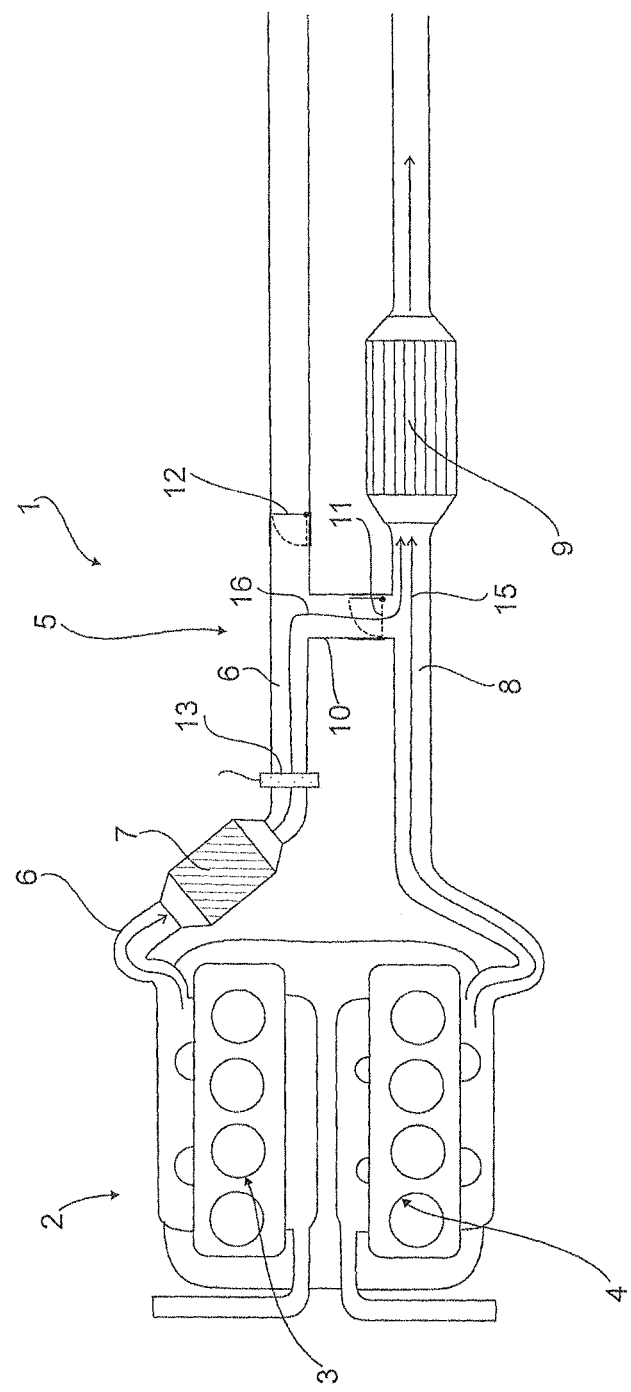
FIG. 2 shows the embodiment as shown in FIG. 1 in reducing agent operation.

FIGS. 1 and 2 show a first structure of an exhaust gas purification device 1 according to the invention, with an internal combustion engine 2, designed here as a V8 internal combustion engine with a first cylinder bank 3 and a second cylinder bank 4.

A double-flow exhaust gas line is connected to this internal combustion engine 2 and has a first partial exhaust gas line as the NSC partial exhaust gas line 6 having a $NO_x$ storage catalytic converter 7 and a second partial exhaust gas line as a SCR partial exhaust gas line 8 having a SCR catalytic converter 9.

The NSC partial exhaust gas line 6 here is assigned to the first cylinder bank 3, while the SCR partial exhaust gas line 8 is assigned to the second cylinder bank 4.

Proceeding from the two cylinder banks 3, 4, the two partial exhaust gas lines 6, 8 run essentially parallel to one another, in a region downstream from the $NO_x$ storage catalytic converter 7 there being an overflow pipe as a intermediate cross connection 10 which discharges upstream from the SCR catalytic converter into the SCR partial exhaust gas line.

As can be further taken from FIG. 1, in the region of the intermediate cross connection 10 there is a first exhaust gas flap 11 shown only schematically here, while downstream from the outlet region of the intermediate cross connection 10 in the $NO_x$ partial exhaust gas line 6, there is a second exhaust gas flap 12. These two exhaust gas flaps 11, 12 are coupled by means of a control device which is not shown here and which triggers the two exhaust gas flaps between their flow clearance position and their flow blocking position according to selected control parameters. The control parameters are selected depending on the operation of the internal combustion engine 2, as will be detailed below.

Furthermore a $NO_x$ sensor 13, by means of which the nitrogen oxide portion in the exhaust gas flow is detected by signal technology and can be evaluated in an assigned control device, is connected downstream to the $NO_x$ storage catalytic converter 7.

This exhaust gas purification device 1 works as follows:

In lean operation of the internal combustion engine, the two partial exhaust gas lines 6, 8 are supplied with a lean exhaust gas mixture which is discharged in the form of the partial exhaust gas flows 14, 15 shown only schematically here through the two partial exhaust gas lines 6, 8. In this lean operation, the nitrogen oxides are stored in the $NO_x$ storage catalytic converter 7, as a result of which they are reduced in the first partial exhaust gas flow 14, while in the SCR catalytic converter 9 with consumption of ammonia as a reducing agent stored therein, nitrogen oxide reduction takes place in the second partial exhaust gas flow. As is shown schematically in FIG. 1, in this lean operation, the first exhaust gas flap 11 is in the closed position, while the second exhaust gas flap 12 is in the clearance position. In this way, the flow path for the first partial exhaust gas flow 14 is cleared along the NSC partial exhaust gas line 6, while the intermediate cross connection 10 is blocked so that mixing of the two partial exhaust gas flows 14, 15 cannot take place.

If at this point, by means of the $NO_x$ sensor 13, for example, it is ascertained that no further nitrogen oxide storage in the $NO_x$ storage catalytic converter 7 is possible, i.e., at least one nitrogen oxide store of the $NO_x$ storage catalytic converter 7 is completely filled, then switchover of the operating mode of the first cylinder bank 3 to substoichiometric rich operation takes place, while lean operation for the second cylinder bank 4 continues to be maintained. Furthermore, at the same time, switchover of the two exhaust gas flaps 11, 12 into the positions shown in FIG. 2 takes place, i.e., that the first exhaust gas flap 11 is located in a clearance position and clears the flow connection by means of the intermediate cross connection 10 between the two partial exhaust gas lines 6, 8, while the second exhaust gas flap 12 now blocks the NSC partial exhaust gas line 6 in the region downstream from the intermediate cross connection 10.

As a result of the substoichiometric operation of the first cylinder bank, the nitrogen oxide stored in the $NO_x$ storage catalytic converter 7, in particular as nitrates, becomes free and reacts with the hydrogen in the exhaust gas to ammonia which then by means of the first partial exhaust gas flow 16 flows via the intermediate cross connection 10 like the second partial exhaust gas flow 15 to and by way of the SCR catalytic converter 9 in which the ammonia is stored as a reducing agent for the nitrogen oxides.

After it has been determined in turn by means of the $NO_x$ sensor 13 that the proportion of nitrogen oxides in the first partial exhaust gas flow 16 in the region following the $NO_x$ storage catalytic converter 7 is so small that it can be assumed that the nitrogen oxide store of the $NO_x$ storage catalytic converter 7 has been emptied, in turn repeated switchover of the operating mode of the first cylinder bank 3 which is then in turn operated in lean operation takes place. At the same time, in turn, switchover of the two exhaust gas flaps 11, 12 takes place so that the state which was detailed in conjunction with FIG. 1 is present again.

These processes, accordingly, repeat cyclically and lead to ammonia being able to be produced in the exhaust gas system without additional injection of fuel, in which in conjunction with a second exhaust gas line 5 only the first cylinder bank 3 is switched over in terms of the operating mode. I.e., that only for a short time interval one of the cylinder banks 3, 4, specifically the cylinder bank 3 which is the first in the sample case, need be switched to the substoichiometric rich operating mode, not, however, the second cylinder bank 4, as a result of which altogether considerable fuel saving potential arises and, in addition, potentially required torque demands by the driver can be met.

Figure 3:
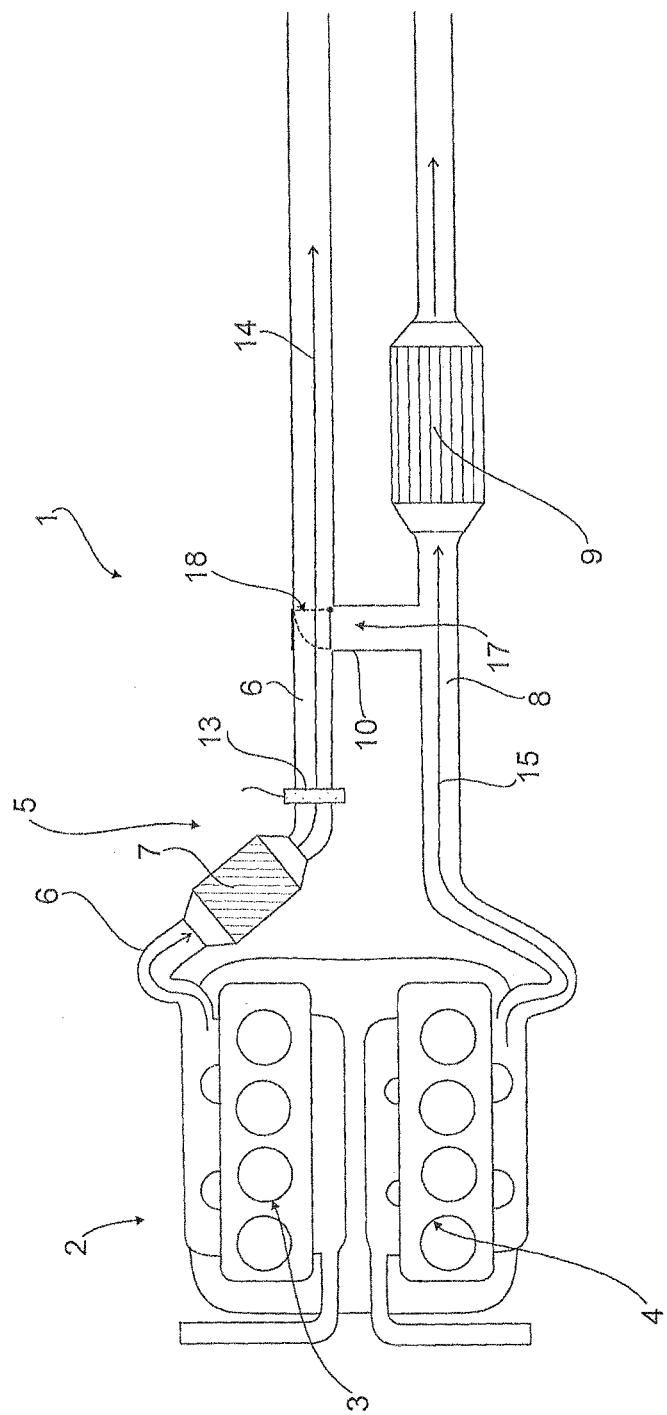
FIG. 3 shows an alternative, second embodiment of this invention, in lean operation of the internal combustion engine.
Figure 4:
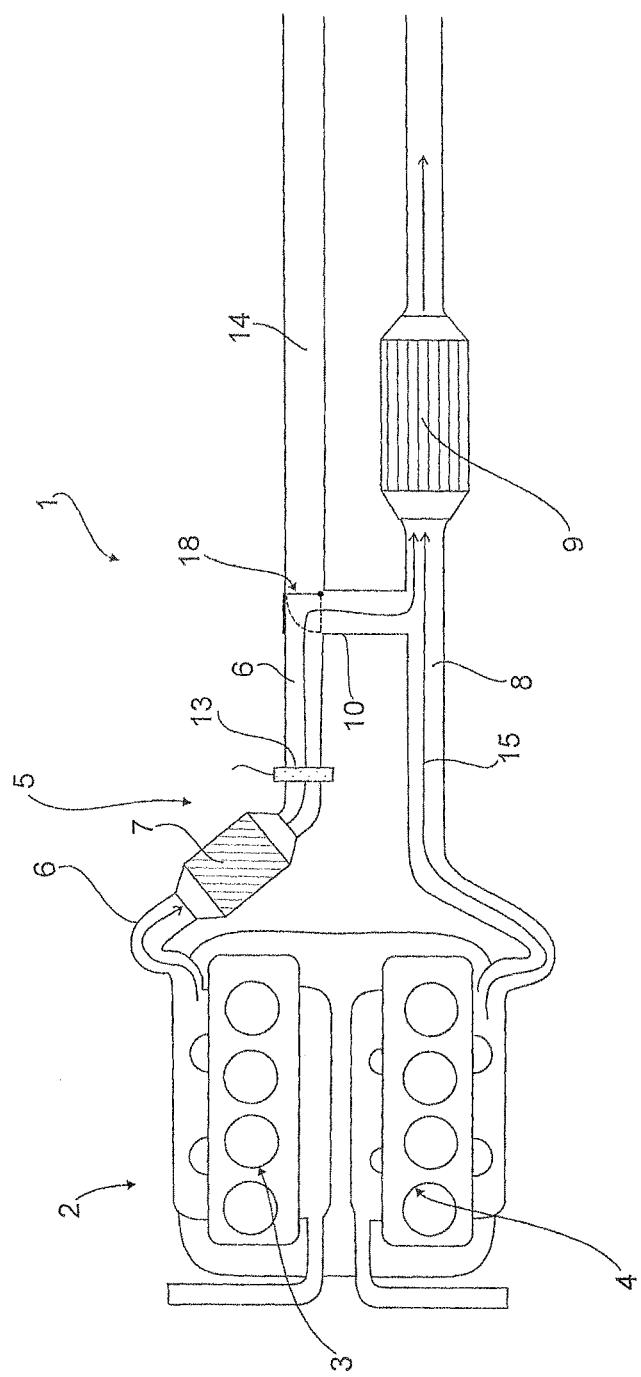
FIG. 4 shows the embodiment as shown in FIG. 3 in reducing agent operation.

The embodiment of the exhaust gas purification device 1 shown in FIGS. 3 and 4 differs from that of FIGS. 1 and 2 only in that instead of the two exhaust gas flaps 11, 12 in the outlet region 17 of the intermediate cross connection 10 in the NSC partial exhaust gas line, there is a 2-way valve which, in the lean operating phase shown in FIG. 3, blocks the intermediate cross connection 10 and clears the NSC partial exhaust gas line 6 for flow. In the regeneration agent production phase shown in FIG. 4, in which the first cylinder bank 3 is operated substoichiometrically, the flow connection to the intermediate cross connection 10 is cleared and the NSC partial exhaust gas line 6 downstream from the outlet region is blocked. Otherwise, this embodiment corresponds in terms of structure and manner of operation identically to the one already explained in conjunction with FIGS. 1 and 2.

The invention claimed is:

1. A system for purifying the exhaust gases of an internal combustion engine comprising:
   a first exhaust gas line connected to a first set of cylinders of said engine, including a catalytic converter functional to store $NO_x$ upon lean operation of said first set of cylinders;
   a second exhaust gas line connected to a second set of cylinders of said engine, including a catalytic converter functional to store ammonia, wherein during lean operation of the first set of cylinders, a first partial exhaust gas flows through the first exhaust gas line and a second partial exhaust gas flows through the second exhaust gas line; and
   means responsive to a selected storage capacity of $NO_x$ in said first mentioned catalytic converter and a substoichiometric rich operation of said first set of cylinders for unilaterally diverting the flow of gases in said first exhaust gas line downstream of said first mentioned catalytic converter through an intermediate cross-connection to said second exhaust line upstream of said second mentioned catalytic converter while simultaneously blocking the first partial exhaust gas flow through the first exhaust gas line downstream of the intermediate cross-connection.

2. The system according to claim 1 including means for operating said second set of cylinders at a lean stoichiometric ratio during substoichiometric operation of said first set of cylinders.

3. A method of purifying the exhaust gases of an internal combustion engine comprising:
   conducting a first stream of exhaust gases from a first set of cylinders of said engine along a first exhaust gas line including an $NO_x$ storage catalytic converter during a lean operation of the first set of cylinders;
   conducting a second stream of exhaust gases from a second set of cylinders of said engine along a second exhaust line including a catalytic converter with ammonia storage capability during the lean operation of the first set of cylinders;
   sensing a selected capacity of said $NO_x$ storage catalytic converter; and
   diverting the flow of said first stream of exhaust gases from said first exhaust gas line downstream of said $NO_x$ storage catalytic converter through an intermediate cross-connection to said second exhaust gas line upstream of said catalytic converter with ammonia storage capability while simultaneously blocking the first stream of exhaust gases through the first exhaust gas line downstream of the intermediate cross-connection, and operating said first set of cylinders at a substoichiometric rich ratio, responsive to sensing said selected capacity of said $NO_x$ storage catalytic converter.

4. The method of claim 3 including operating said second set of cylinders at a lean stoichiometric ratio.

* * * * *